US012181116B2

(12) United States Patent
Lee

(10) Patent No.: US 12,181,116 B2
(45) Date of Patent: Dec. 31, 2024

(54) LAMP MODULE FOR VEHICLE AND LAMP FOR VEHICLE INCLUDING THE SAME

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/345,281

(22) Filed: Jun. 30, 2023

(65) Prior Publication Data

US 2024/0011612 A1 Jan. 11, 2024

(30) Foreign Application Priority Data

Jul. 8, 2022 (KR) ........................ 10-2022-0084485

(51) Int. Cl.
*F21S 41/32* (2018.01)
*F21S 41/24* (2018.01)
*F21S 41/29* (2018.01)

(52) U.S. Cl.
CPC ............... *F21S 41/24* (2018.01); *F21S 41/29* (2018.01); *F21S 41/322* (2018.01)

(58) Field of Classification Search
CPC .......... F21S 41/24; F21S 41/322; F21S 41/18; F21S 41/27; F21S 41/25; F21S 41/285;
(Continued)

(56) References Cited

U.S. PATENT DOCUMENTS

2013/0242590 A1 9/2013 Fedosik et al.
2016/0230949 A1* 8/2016 de Lamberterie .... F21S 41/148
2019/0011103 A1* 1/2019 Suwa ...................... F21S 41/16

FOREIGN PATENT DOCUMENTS

CN 205174192 U * 4/2016
EP 3299703 A1 * 3/2018 ............ F21S 41/147
(Continued)

OTHER PUBLICATIONS

Search English translation of EP 3299703 A1 (Year: 2018).*
(Continued)

*Primary Examiner* — Omar Rojas Cadima
(74) *Attorney, Agent, or Firm* — NovoTechIP International PLLC

(57) ABSTRACT

Disclosed is a lamp module for a vehicle including a first light source that outputs light, and a light guide part provided on a front side of the first light source, and having a first recessed area, to which the light output from the first light source is input and which has a shape that is recessed upwards from a lower surface thereof, the light guide part includes a rear light guide section defining a rear area of the light guide part, and a front light guide section provided on a front side of the rear light guide section, and defining a front area of the light guide part, the rear light guide section includes a total reflection surface, which the light output from the first light source reaches and that totally reflects the light and deliver the light to the front light guide section, the total reflection surface is formed on an upper surface of the rear light guide section, and the light that was reflected by the total reflection surface and reached the front light guide section is output to an outside to form a first light distribution pattern.

17 Claims, 7 Drawing Sheets

(58) Field of Classification Search
CPC ........ F21S 41/255; F21S 41/275; F21S 43/26; F21S 41/265; F21S 43/237; F21S 43/239; F21S 41/26; F21S 43/241; F21S 43/236; F21S 43/235; F21S 43/315; G02B 6/00; G02B 6/0028; G02B 19/0028; G02B 27/0905; G02B 27/09; G02B 27/0911; G02B 19/0023; G02B 19/0019; G02B 6/0001; F21V 7/0091
See application file for complete search history.

(56) References Cited

FOREIGN PATENT DOCUMENTS

| | | | | |
|---|---|---|---|---|
| EP | 3604910 | A1 * | 2/2020 | ............ F21S 41/147 |
| JP | 2016-025090 | A | 2/2016 | |
| KR | 10-2020-0059152 | A | 5/2020 | |
| WO | WO-2021085298 | A1 * | 5/2021 | .............. F21S 41/24 |

OTHER PUBLICATIONS

Search English translation of EP 3604910 A1 (Year: 2020).*
Search English translation of WO-2021085298-A1 (Year: 2021).*
Search English translation of CN 205174192 U (Year: 2016).*
Office Action issued on Oct. 28, 2024 in corresponding Korean application No. 10-2023-0041312.

* cited by examiner

LAMP MODULE FOR VEHICLE AND LAMP FOR VEHICLE INCLUDING THE SAME

CROSS-REFERENCE TO RELATED APPLICATIONS

This application claims the benefit of priority to Korean Patent Application No. 10-2022-0084485, filed in the Korean Intellectual Property Office on Jul. 8, 2022, the entire contents of which are incorporated herein by reference.

TECHNICAL FIELD

The present disclosure relates to a lamp module for a vehicle and a lamp for a vehicle including the lamp module, and more particularly, to a lamp module for a vehicle having a structure of an enhanced optical efficiency and a lamp for a vehicle including the lamp module.

BACKGROUND

Various kinds of lamps for a vehicle are mounted on vehicles according to functions thereof. For example, low beam lamps, high beam lamps, and daytime running light (DRL) lamps, and the like are mounted on a front side of a vehicle.

According to a conventional technology, because various kinds of lamps are mounted on a vehicle together, requirements of users in an aspect of design of a vehicle when lamps are turned on cannot be satisfied as light emission surfaces formed by the lamps are different, and spaces occupied by the lamps in the vehicle are excessively large as the various kinds of lamps are mounted on the vehicle.

Furthermore, according to the conventional technology, chromatic aberrations occur as refractive indexes of lenses provided in the lamp for a vehicle are different, and this deteriorates product values of light distribution patterns.

SUMMARY

The present disclosure has been made to solve the above-mentioned problems occurring in the prior art while advantages achieved by the prior art are maintained intact.

An aspect of the present disclosure provides a lamp module having a structure that may be differentiated in an aspect of design of a vehicle by, one lamp for a vehicle, performing two or more functions such that one light emission surface may be shared even when lamps of different functions are turned on.

Another aspect of the present disclosure provides a lamp module for a vehicle that may enhance a product value of a light distribution pattern by minimizing chromatic aberrations that occur as refraction indexes of lenses are different according to wavelengths of light.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp module for a vehicle includes a first light source that outputs light, and a light guide part provided on a front side of the first light source, and having a first recessed area, to which the light output from the first light source is input and which has a shape that is recessed upwards from a lower surface thereof, the light guide part includes a rear light guide section defining a rear area of the light guide part, and a front light guide section provided on a front side of the rear light guide section, and defining a front area of the light guide part, the rear light guide section includes a total reflection surface, which the light output from the first light source reaches and that totally reflects the light and deliver the light to the front light guide section, the total reflection surface is formed on an upper surface of the rear light guide section, and the light that was reflected by the total reflection surface and reached the front light guide section is output to an outside to form a first light distribution pattern.

An optical axis of the first light source and an optical axis of a first input surface formed on a rear surface facing the first light source in the rear light guide section may be formed to have a specific angle.

The optical axis of the first light source may be formed to be inclined to face an upper side as it goes to a front side.

The optical axis of the first input surface of the rear light guide section may be formed to be parallel to a ground surface.

An optical axis of a front surface of the front light guide section may be formed to be parallel to the ground surface.

The light guide part may further include a connection section, a rear end of which is connected to the rear light guide section and a front end of which is connected to the front light guide section, a width of the connection section in a height direction (H) may be smaller than a width of a section connected to the connection section from the rear light guide section in the height direction (H) and a width of a section connected to the connection section from the front light guide section in the height direction (H), and the front light guide section, the rear light guide section, and the connection section may be integrally formed.

An optical axis of the front surface of the front light guide section may be formed on an upper side of the optical axis of the rear light guide section.

The lamp module may further include a collimator provided between the first light source and the light guide part, and to which the light output from the first light source is input and that outputs the input light to the rear light guide section, and an optical axis of the collimator may be formed to be parallel to the optical axis of the first light source.

The optical axis of the first light source, the optical axis of the collimator, and the optical axis of the first input surface of the rear light guide section may be disposed such that all visual lights that are output from the first light source and is input to the rear light guide section via the collimator are totally reflected by the total reflection surface.

The first light source may be provided on a lower side of the optical axis of the first input surface of the rear light guide section.

A rear surface of the rear light guide section may have a symmetrical shape in a height direction (H), and has a symmetrical shape in a widthwise direction (W).

A rear surface of the rear light guide section may have a four-sided shape when being cut in a direction that is perpendicular to an optical axis of the rear surface.

A front surface of the front light guide section may be a portion of an imaginary figure having a rotational symmetrical shape, a center of which is an imaginary axis.

An optical axis of the front surface of the front light guide section may be the imaginary axis that is a rotational symmetrical axis of the imaginary figure.

The lamp module may further include a second light source that faces a lower surface of the light guide part on a lower side of the light guide part, the first recessed area may include a second input surface provided on a front side of the second light source, and to which at least a portion of the light output from the second light source is input, and the second input surface may have a cross-section of a shape that extends in a height direction (H) when being cut in a direction that is parallel to the height direction (H) and a forward/rearward direction (F).

The second input surface may have a cross-section of a shape that is convex rearwards when being cut in a direction that is parallel to the forward/rearward direction (F) and the widthwise direction (W).

The first recessed area may further include an inclined surface provided on a rear side of the second input surface and having a shape that is inclined to be provided on an upper side as it goes to a front side.

The second light source may be provided in a width in a forward/rearward direction (F) of the inclined surface, and an optical axis of the second light source may extend in a direction that faces the second input surface from the second light source.

The first recessed area may further include a connection surface connecting an upper end of the second input surface and an upper end of the inclined surface, and the connection surface may include a cutoff part having a stepped shape, of which heights of opposite surfaces are spaced apart from each other in a widthwise direction (W).

The light guide part may further include an upper inclined part formed on an upper surface of the light guide part, connected to an upper end of a front surface of the light guide part, and formed to be inclined downwards as it goes to a front side.

The upper inclined part may have a planar shape.

According to an aspect of the present disclosure, a lamp for a vehicle including a plurality of lamp modules for a vehicle is provided, the lamp module includes a first light source that outputs light, and a light guide part provided on a front side of the first light source, and having a first recessed area, to which the light output from the first light source is input and which has a shape that is recessed upwards from a lower surface thereof, the light guide part further includes a rear light guide section defining a rear area of the light guide part, and a front light guide section provided on a front side of the rear light guide section, and defining a front area of the light guide part, the rear light guide section includes a total reflection surface, which the light output from the first light source reaches and that totally reflects the light and deliver the light to the front light guide section, the total reflection surface is formed on an upper surface of the rear light guide section, and the light that was reflected by the total reflection surface and reached the front light guide section is output to an outside to form a first light distribution pattern.

The plurality of lamp module may include a plurality of upper lamp modules provided on an upper side and arranged in a horizontal direction, and a plurality of lower lamp modules provided on a lower side of the upper lamp module and arranged in the horizontal direction, and shapes of front surfaces of light guide parts provided in the upper lamp modules and shapes of front surfaces of light guide parts provided in the lower lamp modules may be different.

Second recessed areas provided on lower sides of front surfaces of the light guide parts and having shape that may be recessed upwards are formed, and the second recessed areas may be provided only the plurality of lower lamp modules.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, a lamp module for a vehicle and a lamp for a vehicle according to the present disclosure will be described with reference to the drawings.

Lamp Module for Vehicle

Figure 1:
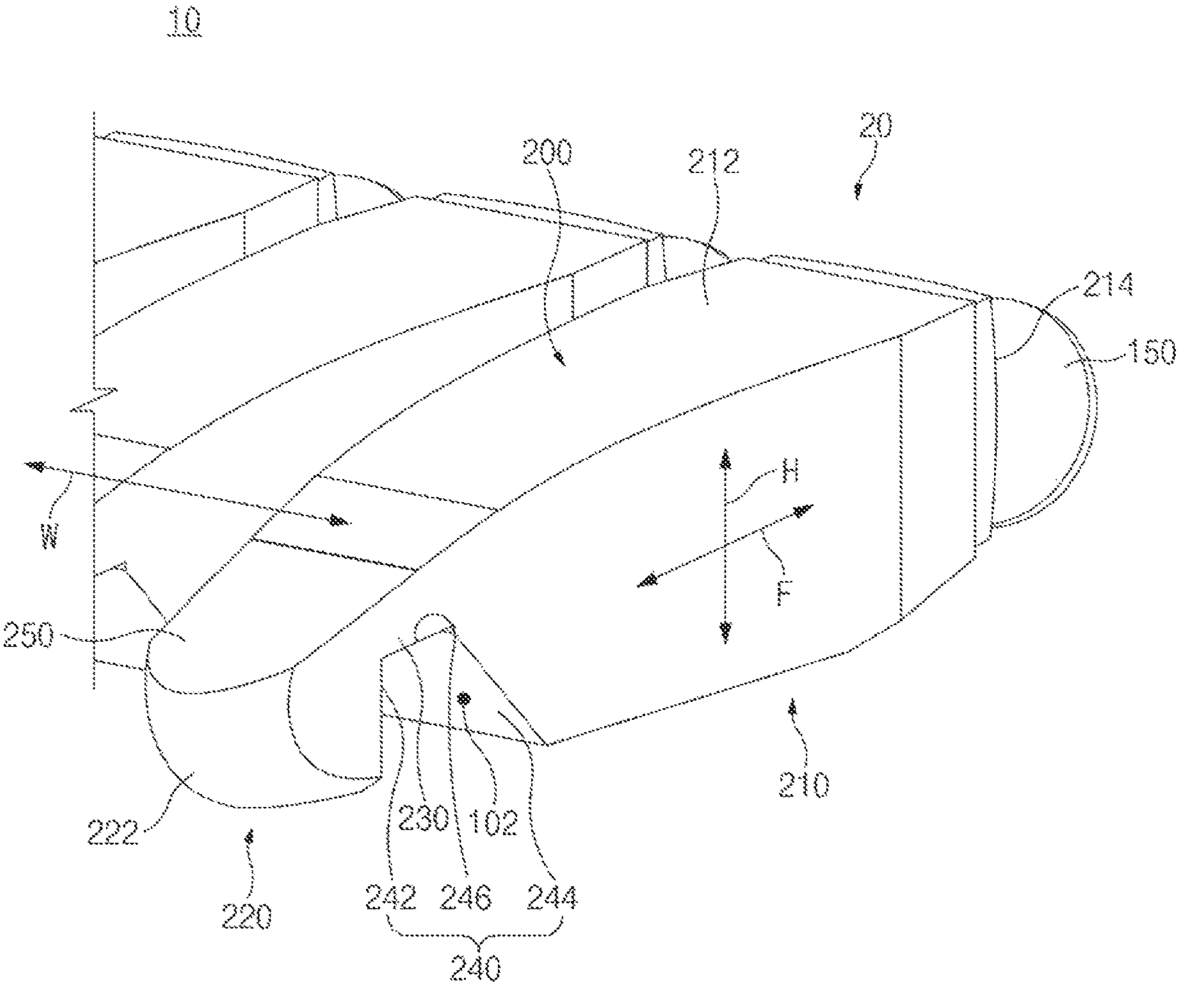
FIG. 1 is a perspective view illustrating a lamp module for a vehicle according to the present disclosure.
Figure 2:
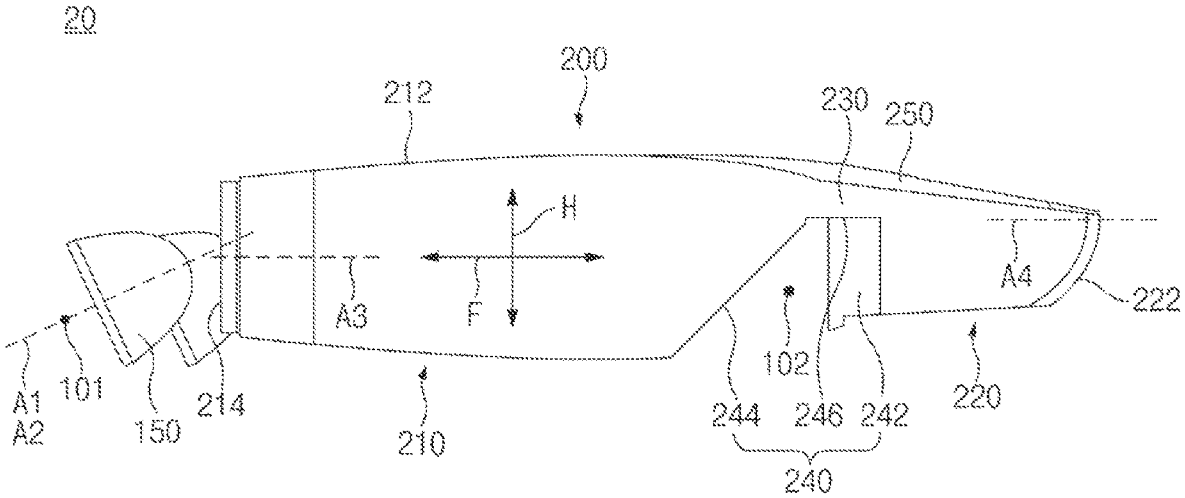
FIG. 2 is a side view illustrating a lamp module for a vehicle according to the present disclosure.
Figure 3:
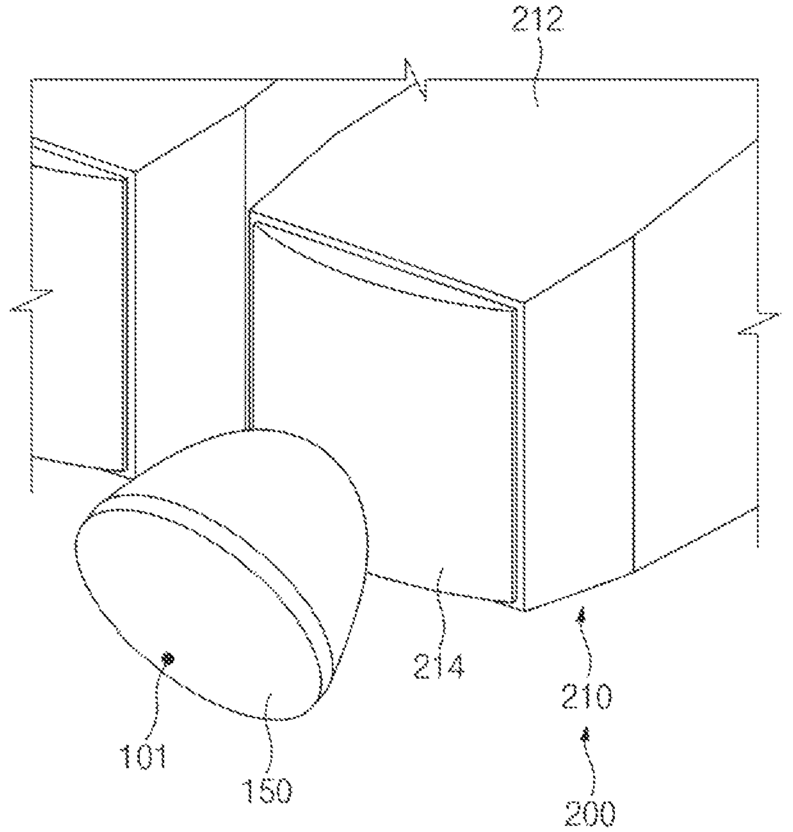
FIG. 3 is a view illustrating a vicinity of a rear surface of a light guide part provided in a lamp module for a vehicle according to the present disclosure.
Figure 4:
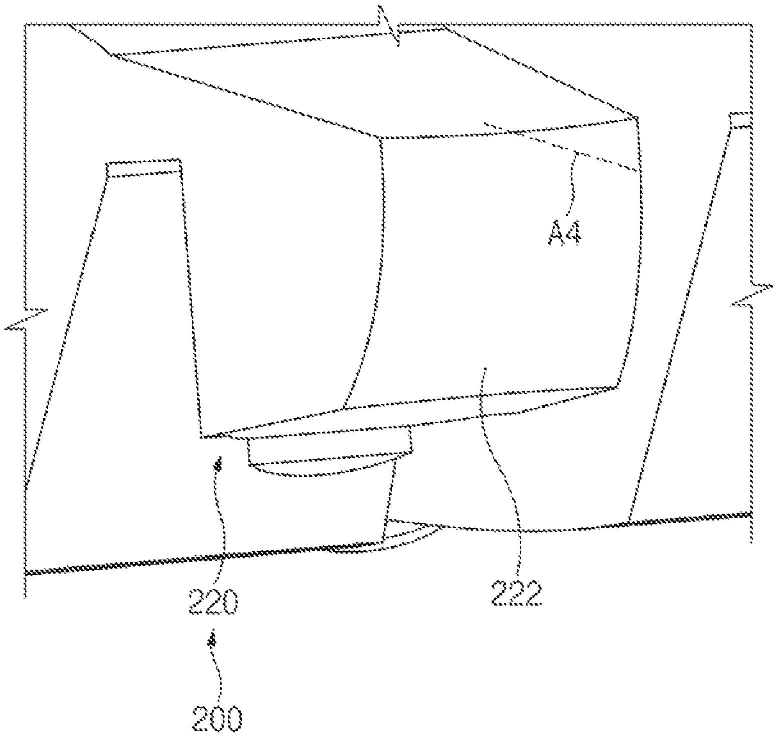
FIG. 4 is a view illustrating a vicinity of a front surface of a light guide part provided in a lamp module for a vehicle according to the present disclosure.
Figure 5:
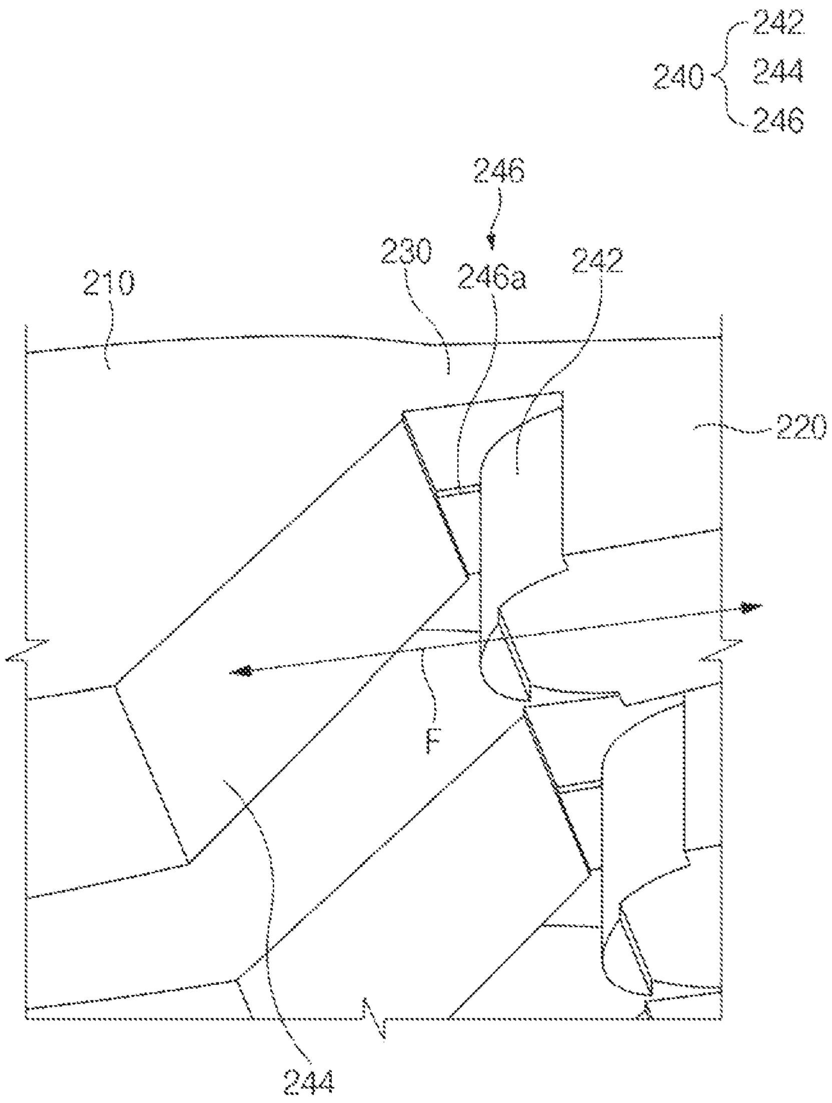
FIG. 5 is a view illustrating a vicinity of a first recessed area of a light guide part provided in a lamp module for a vehicle, when viewed from a bottom, according to the present disclosure.
Figure 6:
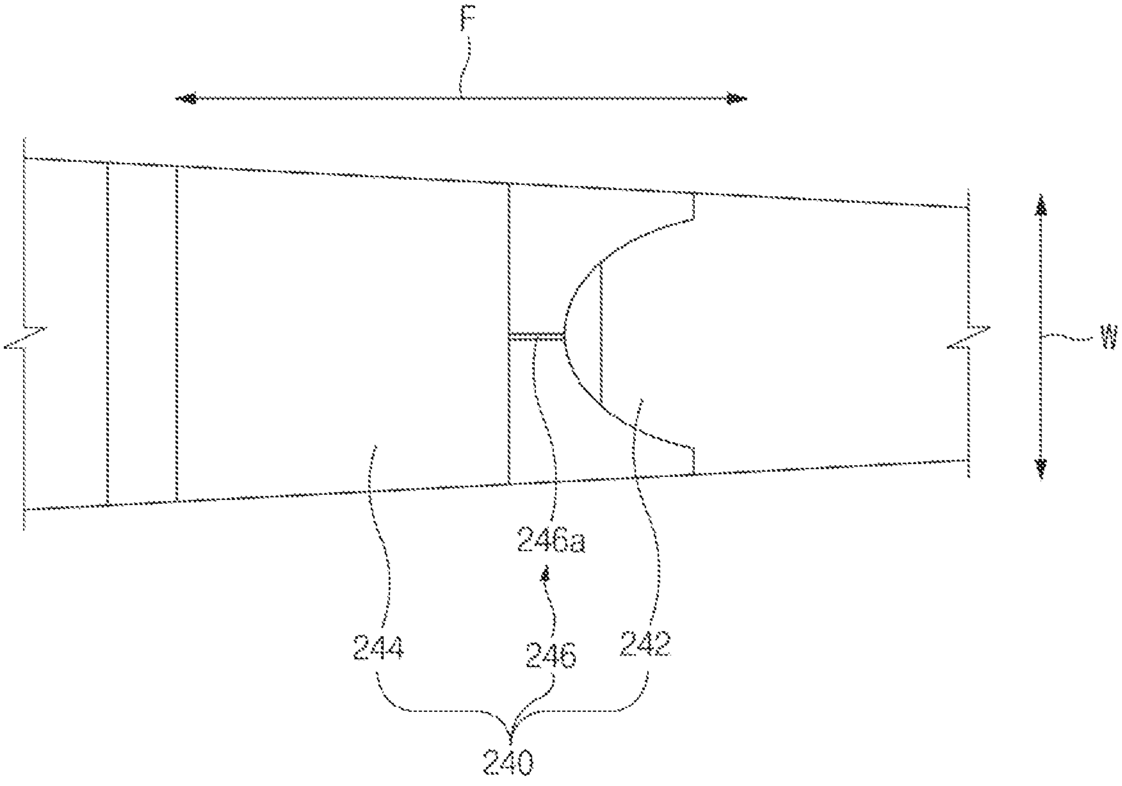
FIG. 6 is a bottom view of a first recessed area of a light guide part provided in a lamp module for a vehicle according to the present disclosure.

FIG. 1 is a perspective view illustrating a lamp module for a vehicle according to the present disclosure. FIG. 2 is a side view illustrating the lamp module for a vehicle according to the present disclosure. FIG. 3 is a view illustrating a vicinity of a rear surface of a light guide part provided (or disposed) in the lamp module for a vehicle according to the present disclosure. FIG. 4 is a view illustrating a vicinity of a front surface of the light guide part provided in the lamp module for a vehicle according to the present disclosure. FIG. 5 is a view illustrating a vicinity of a first recessed area of the light guide part provided in the lamp module for a vehicle, when viewed from a bottom, according to the present disclosure. FIG. 6 is a bottom view of a first recessed area of the light guide part provided in the lamp module for a vehicle according to the present disclosure.

A lamp module 20 (hereinafter, will be referred to as a 'lamp module') for a vehicle according to the present disclosure may be a lamp module that may form a specific light distribution pattern. For example, the lamp module 20 may be a configuration for forming a low beam pattern. However, in addition to the low beam pattern, the lamp module 20 may additionally form a DRL pattern. However, a kind of the light distribution pattern formed by the lamp module 20 is not limited to the above-described contents, and may be applied to various kinds of beam patterns. Furthermore, the lamp module according to the present disclosure is not mounted only on a vehicle with a limitation.

According to the present disclosure, the lamp module 20 may include a first light source 101 that outputs the light, and a light guide part 200 that is provided on a front side of the first light source 101 and to which the light output from the first light source 101 is input. In more detail, the light guide part 200 may include an integral lens. In particular, as will be described below, according to the present disclosure, because two kinds or more of light distribution patterns may be formed through the light guide part 200, one light emission surface may be shared through the one light guide part 200 even when light distribution patterns having different functions are formed. Accordingly, the present disclosure may be differentiated in an aspect of design of a vehicle. Meanwhile, as can be seen from the title, the light guide part 200 may be formed of a material that transmits the light that is output from the first light source 101. Furthermore, the first light source 101 may be an LED, but the kind of the first light source 101 is not limited to the LED.

According to the present disclosure, the light guide part 200 may be divided into a plurality of areas. In more detail, as illustrated in FIGS. 1 and 2, the light guide part 200 may include a rear light guide section 210 that defines a rear area of the light guide part 200, a front light guide section 220 that is provided on a front side of the rear light guide section 210 and defines a front area of the light guide part 200, and a connection section 230, a rear end of which is connected to the rear light guide section 210 and a front end of which is connected to the front light guide section 220.

The rear light guide section 210, the front light guide section 220, and the connection section 230 may be divided with respect to a width in a height direction "H" (or a vertical direction). In more detail, as illustrated in FIGS. 1 and 2, the width of the connection section 230 in the height direction "H" may be smaller than a width of an area connected to the connection section 230 from the rear light guide section 210 in the height direction "H" and a width of an area connected to the connection section 230 from the front light guide section 220 in the height direction "H". This may be understood that the width in the height direction "H" substantially decreases and the width in the height direction "H" becomes minimal in the connection section 230 as the light guide part 200 goes from the rear light guide section 210 to a front side of a forward/rearward direction "F" (or a forward direction), and the width in the height direction "H" substantially increases as it goes to a front side of the forward/rearward direction "F" in the front light guide section 220.

Meanwhile, the front light guide section 220, the rear light guide section 210, and the connection section 230 of the light guide part 200 may be integrally formed. Then, the fact that the configurations are integrally formed may be understood that the above-described configurations are in an inevitable coupling relationship that is as close enough such that they cannot be separated from each other as long as they are not irreversibly destructed.

A first recessed area 240 having a shape that is recessed upwards may be formed on a lower surface of the light guide part 200. As illustrated in FIGS. 1 and 2, the first recessed area 240 may be formed over a lower surface of the above-described rear light guide section 210, a lower surface of the front light guide section 220, and a lower surface of the connection section 230.

As described above, the lamp module 20 may form a low beam pattern. In this case, the light output from the first light source 101 may be output externally (e.g., to an outside of the lamp module 20) via the light guide part 200 to form a low beam pattern.

The first recessed area 240 may be a configuration for shielding a portion of the light output from the first light source 101 to form a low beam pattern required by the rules. Contents of a detailed shape of the first recessed area 240 will be described below.

Referring now to FIGS. 1 and 2, the present disclosure may further include a collimator 150 that is provided between the first light source 101 and the light guide part 200, to which the light output from the first light source 101 is input and from which the input light is output to the rear light guide section 210. The collimator 150 may be a configuration for converting the light output from the first light source 101 to parallel light and outputting the parallel light to the light guide part 200.

Meanwhile, the light output from the light source including the LED outputs visual rays of several wavelength bands. Accordingly, in a process of the light output from the first light source 101 being refracted by the collimator 150, a degree, by which the light is refracted by the collimator 150, rather varies according to the wavelength of the light. This is called a chromatic aberration, and due to the chromatic aberration, an optical path of the light output from the first light source 101 and input to the collimator 150 varies according to a wavelength of the light while the light is output to an outside, and thus, a deviation of the color may occur for areas of the light distribution pattern formed by the light output from the light guide part 200. This may be a cause of degradation of a product value of the light distribution pattern.

To solve the above-described problem, according to the present disclosure, a feature for solving deviations in the colors for the areas of the light distribution pattern according to the above-described chromatic aberrations may be applied by mixing the light output from the collimator 150 and input to the light guide part 200 in the light guide part 200.

In more detail, referring to FIGS. 1 and 2, the rear light guide section 210 may include a total reflection surface 212 that mixes the light output from the collimator 150 by reflecting a substantially entire portion of the light after the light output from the first light source 101 arrives. The light reflected by the total reflection surface 212 may reach the front light guide section 220.

As illustrated in FIGS. 1 and 2, the total reflection surface 212 may be formed on an upper surface of the rear light guide section 210, and the light that is reflected by the total reflection surface 212 and reaches the front light guide section 220 may be output to an outside to form a first light distribution pattern. The first light distribution pattern may be the above-described low beam pattern. In a preferred embodiment, the total reflection surface 212 may be formed on an upper surface of the rear light guide section 210 and an upper surface of the connection section 230. According to the present disclosure, because lights of different wavelengths may be mixed while the substantially entire portion of the light output from the collimator 150 is reflected by the total reflection surface 212, a problem of a product of the light distribution pattern being degraded according to the above-described chromatic aberrations may be solved.

Meanwhile, as illustrated in FIGS. 1 and 2, an optical axis A1 of the first light source 101 and an optical axis A2 of the collimator 150 may be formed in parallel to each other. More preferably, as illustrated in FIGS. 1 and 2, the optical axis A1 of the first light source 101 and the optical axis A2 of the collimator 150 may coincide with each other.

Furthermore, the optical axis A1 of the first light source 101 and an optical axis A3 of a first input surface 214 formed on a rear surface 214 that faces the first light source 101 while the collimator 150 being interposed between the rear surface 214 and the rear light guide section 210 may be formed to have a specific angle. In more detail, the optical axis A1 of the first light source 101 and the optical axis A2 of the collimator 150 may be formed to be inclined upwardly in a forward direction of the lamp module (i.e., inclined to face an upper side as it goes to a front side). As described above, the total reflection surface 212 may be formed on an upper surface of the light guide part 200, and because the light output from the first light source 101 and output via the collimator 150 faces an upper side when the optical axis A1 of the first light source 101 and the optical axis A2 of the collimator 150 faces an upper side as it goes to a front side, the light may efficiently reach the total reflection surface 212, and thus, the lights of the different wavelength bands also may be effectively mixed. Meanwhile, the optical axis A3 of the first input surface 214 of the rear light guide section 210 may be formed in parallel to a ground surface.

Meanwhile, to reflect the substantially entire portion of the lights that are output from the first light source 101 and reach the total reflection surface 212 via the collimator 150, the optical axis A1 of the first light source 101, the optical axis A2 of the collimator 150, the optical axis A3 of the first input surface 214 of the rear light guide section 210 may be disposed such that the substantially entire portion of the visual rays output from the first light source 101 and input to the rear light guide section 210 via the collimator 150 are reflected by the total reflection surface 212. This is because incident angles of all the visual rays that are output from the first light source 101 and reach the total reflection surface 212 via the collimator 150 when they reach the total reflection surface 212 are larger than a critical angle. Furthermore, the first light source 101 may be provided on a lower side of the optical axis A3 of the first input surface 214 of the rear light guide section 210 whereby an amount of the light output from the first light source 101, which reaches the total reflection surface 212 becomes maximal.

Hereinafter, the first input surface formed on the rear surface of the rear light guide section 210 will be described with reference to FIG. 3.

As illustrated in FIG. 3, the rear surface 214 of the rear light guide section 210 may have a symmetrical shape in the widthwise direction "W" while having a symmetrical shape in the height direction "H". Furthermore, the rear surface 214 of the rear light guide section 210 may have a rectangular (i.e., four-sided) cross-sectional shape when intersected (i.e., being cut) in a direction that is perpendicular to the optical axis A3 of the rear surface 214 or the forward/rearward direction "F". More preferably, as illustrated in FIG. 3, the rear surface 214 of the rear light guide section 210 may have a cross-sectional shape that is convex rearwards when being cut in a direction that is perpendicular to the height direction "H". In this case, because the light input to the rear surface 214 may be input to the light guide part 200 after being concentrated, an intensity of light of the light distribution pattern formed by the first light source 101 may be maximized. However, a shape of the rear surface is not limited to the above-described contents, and may have various shapes.

Hereinafter, a front surface 222 of the front light guide section 220 will be described with reference to FIG. 4.

The front surface 222 formed on a front side of the front light guide section 220 may be a part of an imaginary figure having a rotational symmetrical shape about an imaginary axis. For example, the front surface 222 may have a shape, in which a ratio of an area of, among an upper area located on an upper side of the imaginary axis and a lower area located on a lower side thereof in the imaginary figure, the lower area is larger. Then, an optical axis A4 of the front surface 222 of the front light guide section 220 may be defined as the imaginary axis that is the rotational symmetrical axis of the imaginary figure. The front surface 222, as illustrated, has the shape, in which the ratio of the area of the lower area of the imaginary figure having the rotational symmetrical shape is larger so that the intensity of light of the first light distribution pattern is maximized by causing a larger amount of the light output from the first light source 101 and reflected by the total reflection surface 212 to reach to the front surface. Meanwhile, the optical axis A4 of the front surface 222 of the front light guide section 220 may be formed to be parallel to the ground surface, and the optical axis A4 of the front surface 222 of the front light guide section 220 may be parallel to the optical axis A3 of the rear surface 214 of the rear light guide section 210. As an example, FIGS. 1 and 2 illustrate a state, in which the optical axis A4 of the front surface 222 of the front light guide section 220 is formed on an upper side of the optical axis A3 of the rear surface 214 of the rear light guide section 210. In this case, because a larger amount of the light output from the first light source 101 and reflected by the total reflection surface 212 may reach the front surface 222, an intensity of light of the first light distribution pattern may be enhanced.

Meanwhile, as illustrated in FIGS. 1 and 2, the lamp module 20 according to the present disclosure may further include a second light source 102 that is provided to face the lower surface of the light guide part 200 on a lower side of the light guide part 200. The second light source 102 may be a configuration for irradiating light that forms a second light distribution pattern that is a separate light distribution pattern from the first light distribution pattern formed by the first light source 101. In more detail, the light irradiated from the second light source 102 may form the second light distribution pattern while being output to an outside through the front surface 222 of the light guide part 200 after being input to the light guide part 200. For example, the second light distribution pattern may be a DRL pattern, but a kind of the second light distribution pattern is not limited thereto.

However, the second light source 102 is not an essential configuration of the lamp module 20 according to the present disclosure, and unlike the illustration of FIG. 1 and FIG. 2, the second light source 102 may not be provided in the lamp module 20. More preferably, the second light source 102 may be configured to face the first recessed area 240.

Meanwhile, the first recessed area 240 may include a plurality of surfaces. In more detail, the first recessed area 240 may include a second input surface 242, which is provided on a front side of the second light source 102 and to which at least a portion of the light output from the second light source 102 is input, an inclined surface 244 that is provided on a rear side of the second input surface 242 in the forward/rearward direction "F" and has a shape that is inclined to be provided on an upper side as it goes to a front side, and a connection surface 246 that connects an upper end of the second input surface 242 and an upper end of the inclined surface 244. Accordingly, the light guide part 200 may have a substantially "U" shape that is inverse in the height direction as the first recessed area 240 includes the second input surface 242, the connection surface 246, and the inclined surface 244 when the light guide part 200 is viewed from one side in a widthwise direction "W".

As illustrated in FIG. 2, as an example, the second input surface 242 may have a cross-section of a shape that extends in the height direction "H" when being cut in a direction that is parallel to the height direction "H" and the forward/rearward direction "F". This may be understood that the second input surface 242 has a cross-sectional shape that extends substantially downwards perpendicularly to an upper end connected to the connection surface 246.

However, the above-described contents do not mean that the second input surface 242 has a planar shape that extends perpendicularly. Rather, as illustrated in FIGS. 2, 5, and 6, it may be preferable that the second input surface 242 has a cross-section of a shape that is convex rearwards when being cut in a direction that is parallel to the forward/rearward direction "F" and the widthwise direction "W". This is because an intensity of light of the second light distribution pattern formed by the second light source 102 is maximized by concentrating the light output from the second light source 102 in the second input surface 242 after the light being input to the second input surface 242. However, the second input surface 242 may have a planar shape that extends perpendicularly unlike the above description.

Meanwhile, as illustrated in FIG. 2, the second light source 102 may be provided in a width of the inclined surface 244 in the forward/rearward direction "F". In more detail, the optical axis of the second light source 102 may extend from the second light source in a direction that faces the second input surface 242. In this case, the light output from the second light source 102 may not be reflected by the other configurations but proceeds straight to be input to the second input surface 242, and thus an intensity of light of the second light distribution pattern may be maximized.

Meanwhile, in a preferred embodiment of the present disclosure, a focus of the front surface 222 of the front light guide section 220 may be located at a location corresponding to a front end of the connection surface 246. This is because an intensity of light of the first light distribution pattern may be maximized by outputting the substantially entire portion of the light output from the first light source 101 and reflected by the total reflection surface 212 to the front surface 222 after the light is concentrated at the focus of the front surface 222.

Meanwhile, as described above, the first light distribution pattern formed by the light output from the first light source 101 may be a low beam pattern. Meanwhile, a cutoff line having a stepped shape is required to be formed in an upper area of the low beam pattern by the rules.

To satisfy the above-described requirements of the rules, which are required for the low beam pattern, referring to FIGS. 5 and 6, the connection surface 246 may include a cutoff part **246*a* having a stepped shape, in which heights of opposite side surfaces thereof, which are spaced apart from each other in the widthwise direction "W", are different. A portion of the substantially entire portion of the light reflected by the total reflection surface 212 may be shielded by the cutoff part 246*a* to form a cutoff line having a shape corresponding to the cutoff part 246*a* in the first light distribution pattern. Meanwhile, a portion of the light output from the first light source 101 also may be shielded by the inclined surface 244 of the first recessed area 240**. Accordingly, the light may not reach an upper area of the cutoff line of the low beam pattern or only an amount of the light, by which it may be identified whether an object is present at night, may reach it.

Meanwhile, referring to FIGS. 1 and 2, the light guide part 200 provided in the lamp module 20 may further include an upper inclined part 250 that is formed on an upper surface of the light guide part 200, is connected to an upper end of the front surface 222 of the light guide part 200, and is inclined downwards as it goes to a front side. In more detail, a front end of the upper inclined part 250 may be connected to the front surface 222, and a rear end of the upper inclined part 250 may be connected to the total reflection surface 212.

A portion of the substantially entire portion of the light that is output from the first light source 101 and is reflected by the total reflection surface 212 to reach the focus of the front surface 222 may be reflected by the connection surface 246 to proceed upwards, and the light that proceeded upwards may be reflected again by the upper inclined part 250 to be output to an outside while proceeding downwards. Meanwhile, an inclination of the total reflection surface 212 and an inclination of the upper inclined part 250 at a point, at which the total reflection surface 212 and the upper inclined part 250 are connected to each other, may be different. As an example, the upper inclined part 250 may have a planar shape.

Lamp for Vehicle

Figure 7:
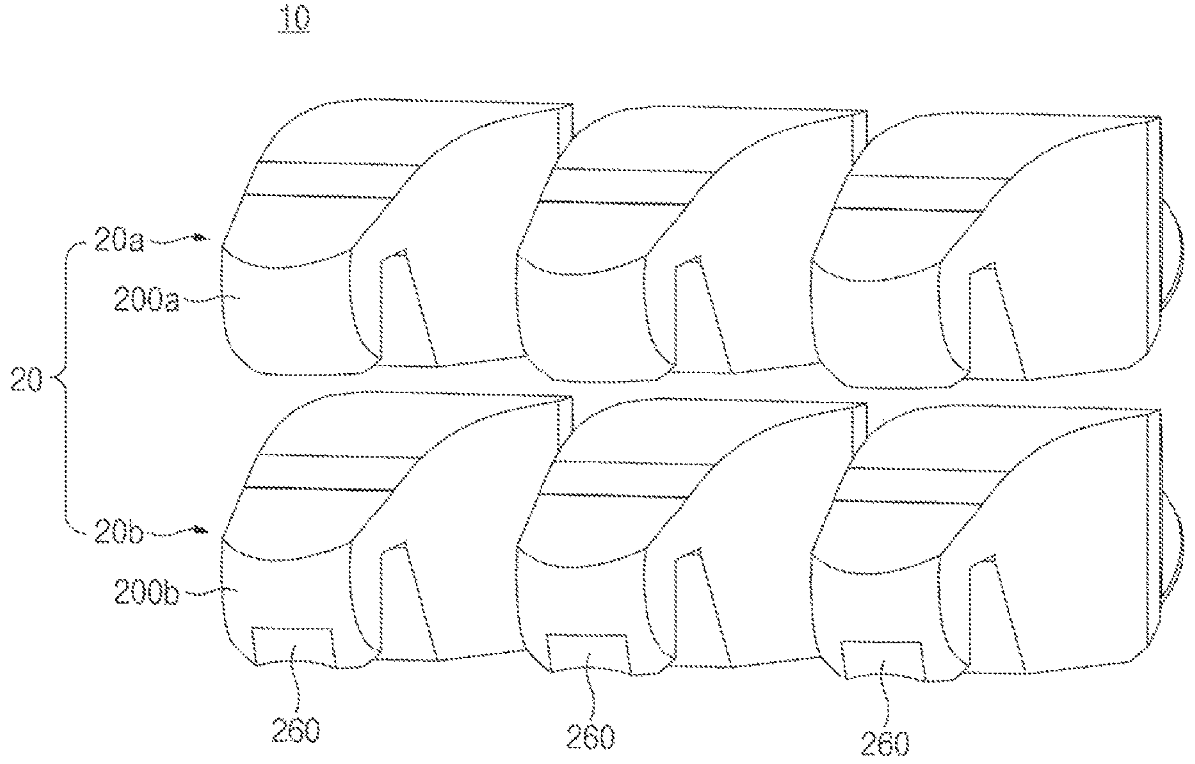
FIG. 7 is a lamp for a vehicle including a plurality of lamp modules for a vehicle according to the present disclosure.

FIG. 7 is a lamp for a vehicle including a plurality of lamp modules for a vehicle according to the present disclosure.

Referring to FIGS. 1 to 7, a lamp 10 (hereinafter, will be referred to as a 'lamp') for a vehicle according to the present disclosure may include a plurality of lamp modules 20.

Each of the plurality of lamp modules 20 may include the first light source 101 that outputs light, and the light guide part 200, which is provided on a front side of the first light source 101, to which the light output from the first light source 101 is input, and in which the first recessed area 240 having a shape that is recessed upwards from the lower surface. Meanwhile, the contents of the lamp modules 20 provided in the lamp 10 according to the present disclosure will be replaced by the contents described above with reference to FIGS. 1 to 6.

The light guide part 200 may include the rear light guide section 210 that defines a rear area of the light guide part 200, and the front light guide section 220 that is provided on a front side of the rear light guide section 210 and defines a front area of the light guide part 200. Then, the rear light guide section 210 may include the total reflection surface 212, which the light output from the first light source 101 reaches and which reflects the light to deliver the light to the front light guide section 220. The total reflection surface 212 may be formed on an upper surface of the rear light guide section 210. According to the present disclosure, the light that is reflected by the total reflection surface 212 and reaches the front light guide section 220 may be output to an outside to form the first light distribution pattern. As described above, the first light distribution pattern may be a low beam pattern.

Meanwhile, as illustrated in FIG. 7, the plurality of lamp modules 20 may include a plurality of upper lamp modules **20*a* that are provided on an upper side and are arranged in a horizontal direction, and a plurality of lower lamp modules 20*b* that are provided on a lower side of the upper lamp modules 20*a* and are arranged in a horizontal direction. Then, according to the present disclosure, a shape of the front surface 222 (see FIG. 2 and the like) of an upper light guide part 200*a* provided in the upper lamp module 20*a* and a shape of the front surface 222 (see FIG. 2 and the like) of a lower light guide part 200*b* provided in the lower lamp module 20*b*** may be different.

In more detail, referring to FIGS. 1, 2, and 7, the front surface 222 of the lower light guide part **200*b* may have a second recessed area 260 that is provided on a lower side of the front surface 222 and has a shape that is recessed upwards. Meanwhile, the upper light guide part 200*a* may not have the above-described second recessed area. That is, according to the present disclosure, the second recessed area 260 may be formed only in the plurality of lower lamp modules 20*b***.

According to the present disclosure, a lamp module having a structure that may be differentiated in an aspect of design of a vehicle by, one lamp for a vehicle, performing two or more functions such that one light emission surface may be shared even when lamps of different functions are turned on is provided.

According to the present disclosure, a lamp module for a vehicle that may enhance a product value of a light distribution pattern by minimizing chromatic aberrations that occur as refraction indexes of lenses are different according to wavelengths of light is provided.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp module for a vehicle, comprising:

a first light source configured to output light and having a first optical axis; and a light guide part disposed in front of the first light source and configured to receive the light output from the first light source, the light guide part including:

a lower surface;

a first recessed area recessed upwardly from the lower surface;

a rear light guide section comprising a rear surface facing the first light source, wherein the first optical axis extends through the rear surface, and the rear surface has a second optical axis traversing the first optical axis; and a front light guide section disposed in front of the rear light guide section, wherein the rear light guide section further comprises an upper surface including a total reflection portion configured to reflect, toward the front light guide section, a substantially entire portion of the light output from the first light source and transmitted to the light guide part via the rear surface, wherein the front light guide section is configured to externally output the substantially entire portion of the light reflected by the total reflection portion toward the front light guide section to form a light distribution pattern, wherein the first recessed area is configured to shield a portion of the light output from the first light source to form a beam pattern, wherein the front light guide section has a front surface having a third optical axis parallel to the ground surface, and wherein the third optical axis of the front surface of the front light guide section extends above the first optical axis of the first input surface of the rear light guide section.

2. The lamp module of claim 1, wherein the first light source is disposed below the second optical axis.

3. The lamp module of claim 1, wherein the first optical axis is inclined upwardly in a forward direction of the lamp module.

4. The lamp module of claim 3, further comprising a collimator disposed between the first light source and the light guide part and configured to transmit the light output from the first light source toward the rear light guide section, wherein the collimator has a third optical axis parallel to the first optical axis of the first light source.

5. The lamp module of claim 4, wherein the first, second and third optical axes are arranged such that the substantially entire portion of the light transmitted from the first light source toward the rear light guide section via the collimator is reflected by the total reflection portion.

6. The lamp module of claim 1, wherein the second optical axis is parallel to a ground surface.

7. The lamp module of claim 6, wherein the third optical axis is parallel to the ground surface.

8. The lamp module of claim 7, wherein:

the light guide part further includes a connection section having (1) a rear end portion connected to the rear light guide section and (2) a front end portion connected to the front light guide section, and the connection section has a thickness smaller than thicknesses of a first section of the rear light guide section connected to the connection section and a second section of the front light guide section connected to the connection section.

9. A lamp module for a vehicle, comprising:

a first light source configured to output light and having a first optical axis; and a light guide part disposed in front of the first light source and configured to receive the light output from the first light source, the light guide part including:

a lower surface;

a first recessed area recessed upwardly from the lower surface;

a rear light guide section comprising a rear surface facing the first light source, wherein the first optical axis extends through the rear surface, and the rear surface has a second optical axis traversing the first optical axis; and a front light guide section disposed in front of the rear light guide section, wherein the rear light guide section further comprises an upper surface including a total reflection portion configured to reflect, toward the front light guide section, a substantially entire portion of the light output from the first light source and transmitted to the light guide part via the rear surface, wherein the front light guide section is configured to externally output the substantially entire portion of the light reflected by the total reflection portion toward the front light guide section to form a light distribution pattern, wherein the first recessed area is configured to shield a portion of the light output from the first light source to form a beam pattern, and wherein the rear surface of the rear light guide section has a vertically and horizontally symmetrical shape.

10. A lamp module for a vehicle, comprising:

a first light source configured to output light and having a first optical axis; and a light guide part disposed in front of the first light source and configured to receive the light output from the first light source, the light guide part including:

a lower surface;

a first recessed area recessed upwardly from the lower surface;

a rear light guide section comprising a rear surface facing the first light source, wherein the first optical axis extends through the rear surface, and the rear surface has a second optical axis traversing the first optical axis; and a front light guide section disposed in front of the rear light guide section, wherein the rear light guide section further comprises an upper surface including a total reflection portion configured to reflect, toward the front light guide section, a substantially entire portion of the light output from the first light source and transmitted to the light guide part via the rear surface, wherein the front light guide section is configured to externally output the substantially entire portion of the light reflected by the total reflection portion toward the front light guide section to form a light distribution pattern, wherein the first recessed area is configured to shield a portion of the light output from the first light source to form a beam pattern, and wherein the rear surface of the rear light guide section has a rectangular shape.

11. A lamp module for a vehicle, comprising:

a first light source configured to output light and having a first optical axis; and a light guide part disposed in front of the first light source and configured to receive the light output from the first light source, the light guide part including:

a lower surface;

a first recessed area recessed upwardly from the lower surface;

a rear light guide section comprising a rear surface facing the first light source, wherein the first optical axis extends through the rear surface, and the rear surface has a second optical axis traversing the first optical axis; and a front light guide section disposed in front of the rear light guide section, wherein the rear light guide section further comprises an upper surface including a total reflection portion configured to reflect, toward the front light guide section, a substantially entire portion of the light output from the first light source and transmitted to the light guide part via the rear surface, wherein the front light guide section is configured to externally output the substantially entire portion of the light reflected by the total reflection portion toward the front light guide section to form a light distribution pattern, wherein the first recessed area is configured to shield a portion of the light output from the first light source to form a beam pattern, further comprising a second light source facing the lower surface of the light guide part and configured to output light, wherein the first recessed area includes a second input surface disposed at a front side of the second light source and configured to receive at least a portion of the light output from the second light source, and wherein the second input surface has a cross-sectional shape that extends vertically when intersected in a direction parallel to a vertical direction and a forward direction of the lamp module.

12. The lamp module of claim 11, wherein the second input surface has a cross-sectional shape that is convex in a rearward direction of the lamp module when intersected in a direction parallel to a forward/rearward direction and widthwise direction of the lamp module.

13. The lamp module of claim 11, wherein the first recessed area further includes an inclined surface at a rear side of the second input surface and inclined upwardly in the forward direction of the lamp module.

14. The lamp module of claim 13, wherein:

the second light source is disposed at the inclined surface of the first recessed area, and the second light source has an optical axis extending in a direction facing the second input surface.

15. The lamp module of claim 13, wherein:

the first recessed area further includes a connection surface connecting an upper end of the second input surface and an upper end of the inclined surface, and the connection surface includes a cutoff part having a step shape.

16. A lamp module for a vehicle, comprising:

a first light source configured to output light and having a first optical axis; and a light guide part disposed in front of the first light source and configured to receive the light output from the first light source, the light guide part including:

a lower surface;

a first recessed area recessed upwardly from the lower surface;

a rear light guide section comprising a rear surface facing the first light source, wherein the first optical axis extends through the rear surface, and the rear surface has a second optical axis traversing the first optical axis; and a front light guide section disposed in front of the rear light guide section, wherein the rear light guide section further comprises an upper surface including a total reflection portion configured to reflect, toward the front light guide section, a substantially entire portion of the light output from the first light source and transmitted to the light guide part via the rear surface, wherein the front light guide section is configured to externally output the substantially entire portion of the light reflected by the total reflection portion toward the front light guide section to form a light distribution pattern, wherein the first recessed area is configured to shield a portion of the light output from the first light source to form a beam pattern, wherein the light guide part further includes:

an upper surface; and an upper inclined part disposed on the upper surface, connected to an upper end of a front surface of the light guide part, and inclined downwardly in a forward direction of the lamp module.

17. The lamp module of claim 16, wherein the upper inclined part has a planar shape.

* * * * *